UNITED STATES PATENT OFFICE.

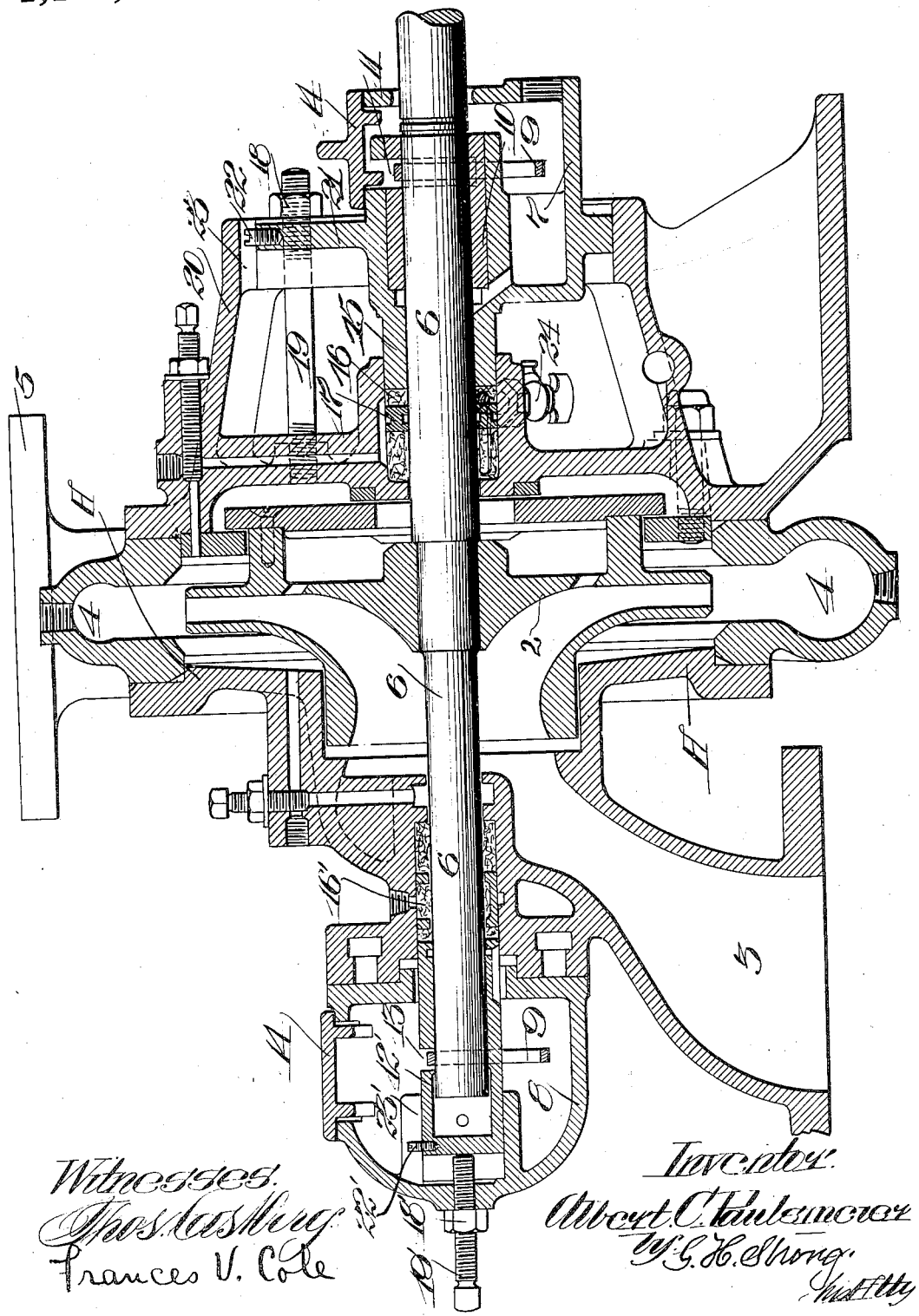

ALBERT C. PAULSMEIER, OF ALAMEDA, CALIFORNIA, ASSIGNOR TO BYRON JACKSON IRON WORKS, OF WEST BERKELEY, CALIFORNIA, A CORPORATION OF CALIFORNIA.

BEARING FOR CENTRIFUGAL PUMPS.

1,102,604. Specification of Letters Patent. Patented July 7, 1914.

Application filed November 9, 1911. Serial No. 659,358.

*To all whom it may concern:*

Be it known that I, ALBERT C. PAULSMEIER, citizen of the United States, residing at Alameda, in the county of Alameda and State of California, have invented new and useful Improvements in Bearings for Centrifugal Pumps, of which the following is a specification.

This invention relates to centrifugal pumps and pertains especially to means for providing a suitable bearing or bearings for the impeller shaft, and at the same time have the bearings adapted to coöperate with a specially designed stuffing box so as to render the pump water sealed or sealed against leakage from the casing which incloses the impeller; also to avoid the use of separate packing glands, yet having the stuffing box distinct and separate from the shaft bearing; and also to simplify construction.

The invention consists of the parts and the construction and combination of parts as hereinafter more fully described and claimed having reference to the accompanying drawings, in which the figure is a longitudinal section of my improved pump.

A is a pump case inclosing the impeller 2.

3 is a suction inlet; and 4 the volute of the case into which the impeller discharges; and 5 is the connection for the discharge pipe.

6 is the impeller shaft which in practice is usually operated about 1200 R. P. M.

The present invention resides especially in the means for mounting the shaft and insulating the pump against leakage from the interior of the case around the shaft.

7 shows a ring oiling bearing for the shaft on that side of the case toward the application of power, and 8 is a ring oiling bearing for the outer end of the shaft adjacent the suction. Each bearing has a ring 9 dipping in the oil reservoir and hanging loose on the shaft; the babbitt 10 of the bearing 7 being cut away on top as shown at 11 and the sleeve gland 12' of the bearing 8 being cut away on top as shown at 13 so that in each case the ring comes in contact with the shaft.

14 is a removable cap by which each bearing may be filled from time to time with oil and access had to its interior.

The bearing 7 is made removable from the pump case and movable along the length of the shaft 6 to enable an annular tail or end projection 15 to telescope gland fashion with a circular pocket 16 formed in the adjacent side of the case immediately around the shaft 6. Within this pocket 16 is contained a suitable packing 17 which is adapted to be compressed by the tail gland 15 when the nuts 18 on the draw-bolts 19 are tightened.

24 is a pet cock for the pressure drain from the pocket or box 16. In practical construction the cover of the case is extended to form a guide flange 20 for the box 7 to be moved back and forth in; the box 7 having an annular flange 21 fitting within the guide flange 20.

22 is a guide pin in flange 21 fitting a slot 23 in flange 20 for the purpose of preventing the bearing 7 from turning. The main body of the bearing 7 is made eccentric and dependent below the shaft 6, so as to hold a quantity of oil. The bolts 19 are secured in the cover of the pump case and project through suitable perforations in the flange or web 21. On the other side of the pump case the bearing is provided with a similar gland and packing means so as to provide a tight joint and exclude the water from the bearings, the slight difference in construction between the two bearings 7 and 8 being mainly due to their positions in the pump. In the case of the bearing 8 a sleeve 12' is used which slips over the end of the shaft 6 and supports the shaft in the bearing 8 in the proper fashion and at the same time the sleeve 12' is prolonged so as to project into a gland pocket or box 16' and compress the packing therein; the compression being regulated from time to time by suitable means as a set screw 19' and lock nut 18'. Sleeve 12' is prevented from turning by means of a guide pin 22' working in a slot 23' formed in a fixed part of the pump.

The chief advantage of the use of a ring oiling bearing with a tail end serving as a gland to the stuffing box avoids separate glands, renders the pump sealed against leakage from the pump case into the bearings, a very important feature, and simplifies construction to a considerable extent. In the case of repairs or replacements, the bearings are easily gotten at and adjustments are easily made. Furthermore, the oil is directly carried from the oil cups from the bearings into the packing glands, thereby rendering the device self-oiling.

Having thus described my invention, what I claim and desire to secure by Letters Patent is—

1. The combination with a shaft, of a bearing, a machine casing through which said shaft extends, an annular projection on said casing forming a pocket surrounding the shaft, an oil casing surrounding the bearing, a projection on said bearing forming a gland and fitting in said pocket, a circular seat on said bearing, a guide flange for said seat, a guideway in said flange, a pin carried by the bearing and sliding in said guideway, and means for sliding said bearing longitudinally upon the shaft.

2. The combination with a shaft, of a bearing, a machine casing through which said shaft extends, an annular projection forming a pocket surrounding said shaft, packing in said pocket, a second projection forming a guide flange, a projection from said bearing forming a gland and telescoping in said pocket, an annular projection on said bearing fitting said guide flange, an oil housing formed integral with the bearing and removable therewith, and means for slidably moving said bearing on the shaft to compress the packing in the pocket.

In testimony whereof I have hereunto set my hand in the presence of two subscribing witnesses.

ALBERT C. PAULSMEIER.

Witnesses:
   F. S. HOFFMANN,
   R. N. FORD.